United States Patent
Ward

(10) Patent No.: US 9,365,197 B2
(45) Date of Patent: Jun. 14, 2016

(54) MANUAL TRANSMISSION LAUNCH CONTROL

(71) Applicant: GM Global Technology Operations LLC, Detroit, MI (US)

(72) Inventor: Douglas A. Ward, Brighton, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 14/521,016

(22) Filed: Oct. 22, 2014

(65) Prior Publication Data

US 2016/0114771 A1    Apr. 28, 2016

(51) Int. Cl.
*B60W 10/00*    (2006.01)
*B60T 8/171*    (2006.01)
*B60T 8/1761*    (2006.01)

(52) U.S. Cl.
CPC ............... *B60T 8/171* (2013.01); *B60T 8/1761* (2013.01)

(58) Field of Classification Search
None
See application file for complete search history.

(56) References Cited

U.S. PATENT DOCUMENTS

| | | | | |
|---|---|---|---|---|
| 4,676,354 A | * | 6/1987 | Janiszewski et al. | 477/92 |
| 6,260,934 B1 | * | 7/2001 | Lee | 303/192 |
| 6,814,414 B1 | * | 11/2004 | Schmitt et al. | 303/191 |
| 6,875,153 B2 | * | 4/2005 | Jager et al. | 477/71 |
| 6,994,407 B2 | * | 2/2006 | Kinder et al. | 303/191 |
| 7,226,389 B2 | * | 6/2007 | Steen et al. | 477/195 |
| 8,103,420 B2 | * | 1/2012 | Amisano et al. | 701/70 |
| 8,412,436 B2 | * | 4/2013 | Mallet et al. | 701/83 |
| 8,521,386 B2 | * | 8/2013 | Hiyoshi et al. | 701/70 |
| 8,589,046 B2 | * | 11/2013 | Pothin et al. | 701/70 |

* cited by examiner

*Primary Examiner* — Dirk Wright

(57) ABSTRACT

A launch control system and method for vehicles equipped with manual transmissions includes a throttle position sensor, a clutch position sensor, a vehicle speed sensor, a system activation switch and a control which receives data from the sensors and controls braking of the non-driven wheels. The control module contains a control algorithm which interrogates the system activation switch, interrogates the clutch position sensor, determines the vehicle speed, interrogates the throttle position sensor and under certain conditions applies the brakes to the non-driving wheels through the vehicle ABS system when the throttle is depressed beyond a predetermined threshold and until the clutch is released beyond a predetermined threshold.

13 Claims, 2 Drawing Sheets

MANUAL TRANSMISSION LAUNCH CONTROL

FIELD

Figure 1:
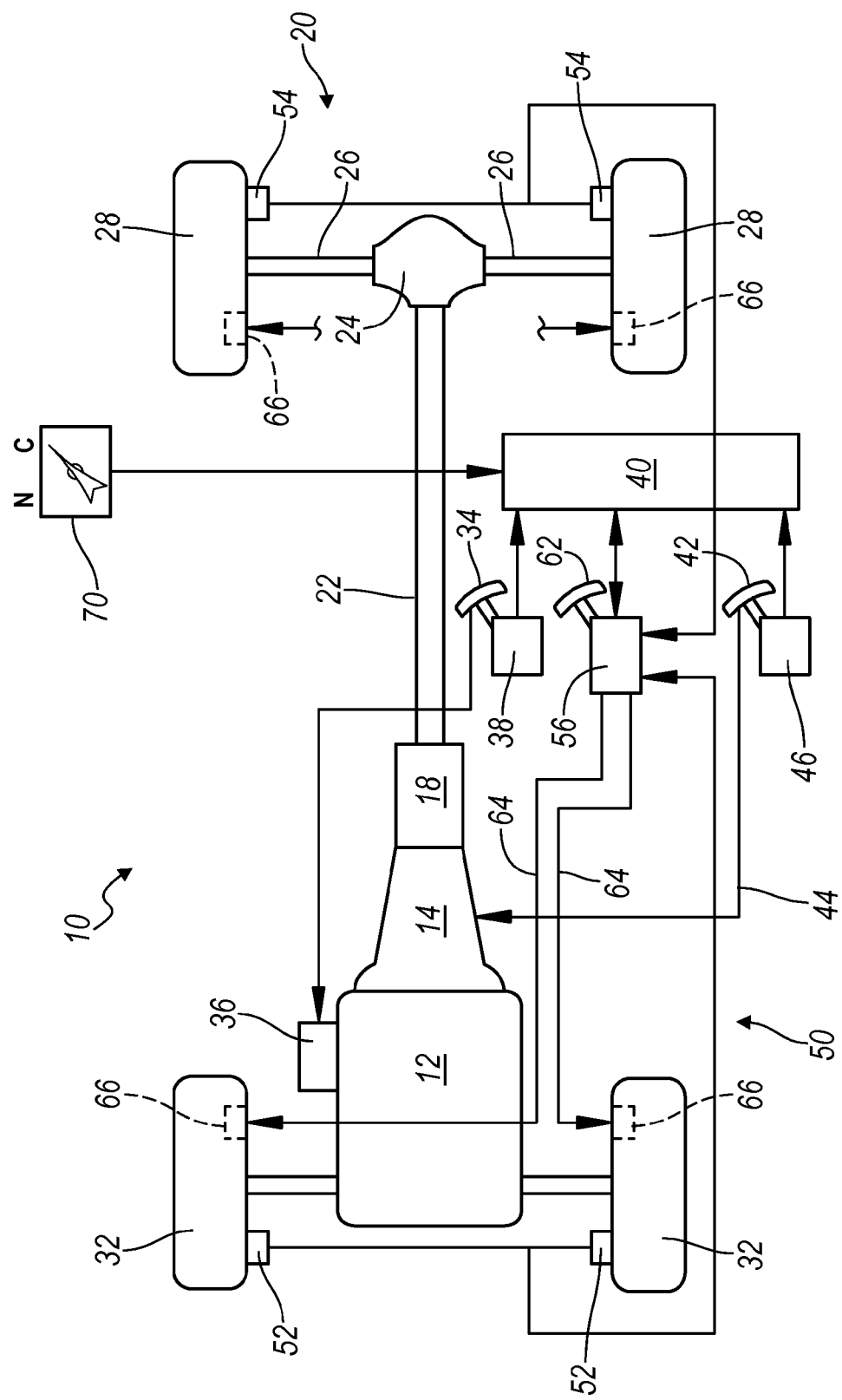

The present disclosure relates to ancillary control systems for vehicles equipped with manual transmissions and more particularly to a launch control system for a vehicle equipped with a manual transmission.

BACKGROUND

The statements in this section merely provide background information related to the present disclosure and may or may not constitute prior art.

A frequently encountered challenge of operating a vehicle having a manual transmission is accelerating from a stop on an incline. With only two feet and three pedals, commencing smooth acceleration without stalling the engine, rolling into the vehicle directly behind or lurching forward requires a certain expertise. A similar, though generally less dramatic problem involves parallel parking on a hill. Here, since both forward and rearward motion may be required, albeit at slower speeds, the operator must also take into account the difference between the gear ratios of first gear and reverse gear as he or she attempts to parallel park the vehicle, ideally without accomplishing same by contact.

The foot versus pedal ratio (2:3) also presents problems in competitive driving situations. While drag strips and launch sites on race tracks tend to be level, any undesired forward or backward motion of the vehicle is problematic. Forward motion may cause the vehicle to roll through the timing beams prematurely which may result in disqualification whereas backward motion will significantly and adversely affect the launch as not only must the vehicle be accelerated but its direction must also be reversed prior to such acceleration.

Accordingly, there is a need for a vehicle equipped with a manual transmission to have the capability, under active, operator control, to remain stationary, in either a level, uphill or downhill orientation, prior to operator initiated motion. The present invention is so directed.

SUMMARY

The present invention provides a launch control system for vehicles equipped with manual transmissions. The system includes a throttle position sensor, a clutch position sensor, a brake activation sensor, a vehicle speed sensor, a system activation switch and a control module which may either be a transmission control module (TCM) or a traction control system (TCS) module which receives data from the sensors and controls braking of the non-driven wheels. The control module contains a control algorithm which interrogates the system activation switch, interrogates the clutch position sensor, determines the vehicle speed, interrogates the throttle position sensor and under certain conditions applies the brakes to the non-driving wheels through the vehicle ABS system when the throttle is depressed beyond a predetermined threshold and until the clutch is released beyond a predetermined threshold.

Thus it is an aspect of the present invention to provide a launch control system for a vehicle having a manual transmission.

Ii is a further aspect of the present invention to provide a launch control algorithm for a vehicle having a manual transmission.

It is a still further aspect of the present invention to provide a launch control system for a vehicle having a manual transmission including a throttle position sensor, a clutch position sensor, a brake activation sensor and a vehicle speed sensor.

It is a still further aspect of the present invention to provide a launch control system for a vehicle having a manual transmission including a throttle position sensor, a clutch position sensor, a brake activation sensor, a vehicle speed sensor, a system activation switch and a transmission control module.

It is a still further aspect of the present invention to provide a launch control algorithm for a vehicle having a manual transmission which interrogates a system activation switch, interrogates a clutch position sensor, determines a vehicle speed and interrogates a throttle position sensor.

It is a still further aspect of the present invention to provide a launch control algorithm for a vehicle having a manual transmission which interrogates a system activation switch, interrogates a clutch position sensor, determines a vehicle speed and interrogates a throttle position sensor and applies the brakes to the non-driving wheels through the vehicle ABS system until the throttle is depressed beyond a predetermined threshold and the clutch is released beyond a predetermined threshold.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
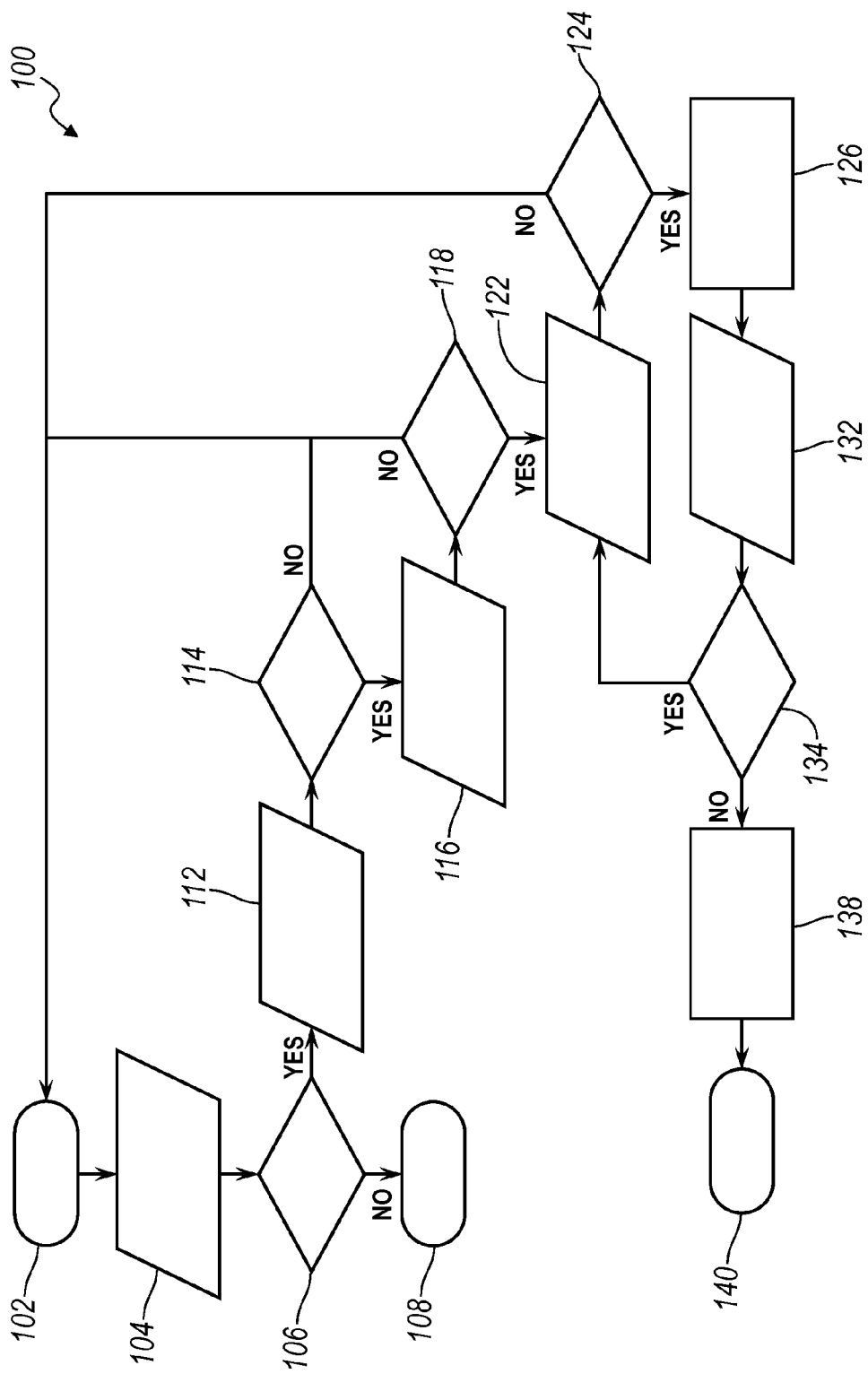

FIG. 1 is a schematic view of a motor vehicle equipped with a launch control system according to the present invention; and FIG. 2 is an algorithm or subroutine contained within a control module according to the present invention.

DETAILED DESCRIPTION

The following description is merely exemplary in nature and is not intended to limit the present disclosure, application, or uses.

With reference now to FIG. 1, a motor vehicle incorporating the present invention is schematically illustrated and generally designated by the reference number 10. The motor vehicle 10 includes a prime mover 12 such as a gasoline, Diesel, flex-fuel or hybrid power plant having an output which drives a manual clutch 14 which is under direct operator control. The manual clutch 14, in turn, drives a manual transmission 18 which is also under direct operator control. The output of the manual transmission 18 is coupled to and drives a final drive assembly 20 which may include, for example, a propeller shaft 22, a differential 24, rear axles 26 and rear tire and wheel assemblies 28.

The motor vehicle 10 also includes front tire and wheel assembles 32 associated with steering components (not illustrated) and a throttle or accelerator pedal 34 which may be either directly connected to or electrically or electronically coupled to a fuel metering or energy controlling component 36 on the prime mover 12. The throttle or accelerator pedal 34 includes a full range, i.e., proportional or analog, position sensor 38 which provides an output indicating the current position of the throttle or accelerator pedal 34 to a transmission control module (TCM) or a traction control system (TCS) module 40. It should be appreciated that either of these devices, as well as other electronic vehicle control modules or a dedicated control module, which both generally include inputs which receive data from powertrain sensors throughout the vehicle, are suitable locations for receiving, processing and outputting signals associated with the algorithm or subroutine of the present invention.

The motor vehicle 10 also includes a clutch pedal 42 which is linked either mechanically through a cable or through a hydraulic line which are both identified by reference number 44 to the manual clutch 14. The clutch pedal likewise includes a full range, i.e., proportional or analog, position sensor 46 which provides an output indicating the current position of the clutch pedal 42 to the control module 40.

With regard to the two position sensors, the throttle position sensor 38 and the clutch position sensor 46, it should be understood that full proportional or analog sensors provide real time data to the control module 40 of the current, exact position of the pedals 34 and 42. Thus, even though only two positions of the clutch pedal 42 (an intermediate threshold and fully depressed) and one position (an intermediate threshold) are significant with regard to operation of the algorithm or subroutine 100 described below, suggesting that a three state and a two state sensor, respectively, could be utilized, the utilization of proportional or analog sensors 38 and 46 allows ready and straightforward adjustment and resetting of the thresholds electronically within the control module 40 to adapt the system to various vehicles, powertrains, engineering criteria, design requirements and performance goals.

The motor vehicle 10 also includes an anti-lock braking system (ABS) 50. The anti-lock braking system 50 includes two front wheel speed sensors 52 and two rear wheel speed sensors 54 which provide information in real time regarding the speed of each front and rear tire and wheel assembly 32 and 28 to an ABS control module 56. The ABS control module 56 is connected to a vehicle brake pedal 62. The ABS control module 56 includes four output hydraulic lines 64, two of which are illustrated in FIG. 1, which individually provide pressurized brake fluid to each brake assembly 66 associated with each tire and wheel assembly 28 and 32. With regard to the present invention, those hydraulic lines 64 associated with the front, non-driven wheels 32 relate to and enable the invention in the rear wheel drive motor vehicle 10 illustrated. If the vehicle were a front wheel drive vehicle, the hydraulic lines involved with and enabling the invention would be those two lines 64 associated with the rear, non-driven wheels 28.

Finally, the vehicle includes a two position, operator selectable switch 70 which selects either a normal driving mode "N" in which the system of the present invention is disabled and the vehicle and its powertrain operates normally or a competitive or launch mode "C" in which the vehicle powertrain operates, inter alia, according to the algorithm or subroutine 100 presented in FIG. 2. The output of the operator selectable switch 70 is provided to the control module 40.

Referring now to FIGS. 1 and 2, the algorithm or subroutine which provides launch control for the manual transmission motor vehicle 10 is illustrated and generally designated by the reference number 100. The algorithm or subroutine 100 may be stored in, for example, a microprocessor contained within the control module 40. The algorithm or subroutine 100 begins with an initializing step 102 which resets and clears all registers and then proceeds to a data acquisition step 104 which interrogates or reads the operator selectable switch 70 to determine whether it is set to "N" for normal operation or "C" for competitive driving and launch control. In the decision point 106, if the switch 70 is set to "N," the algorithm or subroutine 100 exits the decision point 106 at NO, terminates at a first endpoint 108 and the manual transmission 18 and associated systems operate in a normal mode.

If the switch 70 is set to "C," the decision point 106 is exited at YES and the clutch pedal position sensor 46 is interrogated or read in a data acquisition step 112 to determine if the clutch pedal 42 is fully depressed (such that the clutch 14 is full disengaged). In a decision point 114, if the clutch pedal 42, as sensed by the clutch pedal position sensor 46, is not fully depressed, the decision point 114 is exited at NO and the algorithm 100 returns to the initializing step 102. If the clutch pedal 42 is fully depressed, the decision point is exited at YES and the algorithm 100 moves to another data acquisition step 116 which interrogates or reads a vehicle speed sensor such as one or more of the wheel speed sensors 52 and 54 associated with the anti-lock brake system 50 to determine if the motor vehicle 10 is stationary. Typically, all four of the wheel speed sensors 52 and 54 are interrogated and if any one indicates motion of the motor vehicle 10, the algorithm 100 utilizes this information in the following step.

Given the data from the step 116, a decision point 118 is exited at NO if the motor vehicle 10 is not stationary, that is, the motor vehicle 10 is moving, and the algorithm or subroutine returns to the initializing step 102. If the vehicle 10 is stationary, the decision point 118 is exited at YES and a data acquisition step 122 is entered which interrogates or reads the accelerator pedal position sensor 38 to determine the current position of the accelerator pedal 34. A decision point 124 is then entered and if the current position of the accelerator pedal 34 is not depressed beyond a predetermined threshold or position, the decision point 124 is exited at NO and the algorithm returns to the initializing step 102. If the accelerator pedal 34 is depressed beyond the predetermined threshold or position, the decision point 124 is exited at YES and an action or execution step 126 is entered which applies the brakes by pressurizing the two hydraulic lines 64 to the front, non-driving wheels 32. It should be appreciated that the action step 126 is undertaken and accomplished through data sharing and integration of the control module 40 with the anti-lock braking system 50. Additionally, it should be understood that if the motor vehicle 10 is a front wheel drive vehicle, as noted above, the non-driving wheels will be at the rear of the vehicle and it is the brakes of these two (rear) wheels 28 that will be applied.

Next, the algorithm or subroutine 100 moves to another data acquisition step 132 which again interrogates the clutch pedal position sensor 46. Now, if the clutch pedal 44 is (still) depressed beyond a predetermined threshold which substantially coincides with the point of incipient clutch engagement, a decision point 134 is exited at YES and the algorithm 100 returns to the data acquisition step 122 which again interrogates the accelerator position sensor 38. If the manual clutch pedal 44 is not depressed beyond the predetermined threshold, which generally indicates incipient vehicle launch, the decision point 134 is exited at NO and the algorithm 100 moves to an action or execution step 138 which releases the front, non-driving wheel brakes 66 set previously in action step 126. At this point, the motor vehicle 10 may launch under the algorithm 100 without pre-launch forward or backward motion and the algorithm 100 terminates at a second end point 140.

Upon such termination at the end point 140, re-execution of the algorithm or subroutine 100 may be undertaken at any desired iterative speed consistent with, for example, other vehicle computational activity.

The description of the invention is merely exemplary in nature and variations that do not depart from the gist of the invention are intended to be within the scope of the invention. Such variations are not to be regarded as a departure from the spirit and scope of the invention.

What is claimed is:

1. A manual transmission launch control system for a motor vehicle comprising, in combination,
   a operator adjustable switch for enabling said control system,
   a throttle position sensor, a clutch position sensor and at least one vehicle speed sensor,
   means for braking only a pair of non-driving wheels of such vehicle, and a control module having inputs for receiving signals from said throttle position sensor, said clutch position sensor and said at least one vehicle speed sensor and an output for activating said means for braking said pair of non-driving wheels upon a first combination of signals from said sensors and deactivating said means for braking said pair of non-driving wheels upon a second combination of signals from said sensors.

2. The manual transmission launch control system of claim 1 wherein said operator adjustable switch has a first position which deactivates said control system and a second position which activates said control system.

3. The manual transmission launch control system of claim 1 wherein said means for braking a pair of non-driving wheels includes a portion of an anti-lock braking system of such vehicle.

4. The manual transmission launch control system of claim 1 wherein said first combination of signals includes an indication that a manual clutch pedal is fully depressed, that such vehicle is stationary and that a throttle pedal is depressed beyond a predetermined threshold.

5. The manual transmission launch control system of claim 1 wherein said second combination of signals includes an indication that a manual clutch pedal is not depressed beyond a predetermined threshold.

6. The manual transmission launch control system of claim 1 wherein said at least one vehicle speed sensor is a component of an anti-lock braking system.

7. The manual transmission launch control system of claim 1 wherein said means for braking a pair of non-driving wheels brakes front wheels of a rear wheel drive vehicle and rear wheels of a front wheel drive vehicle.

8. A method of eliminating pre-launch movement of a motor vehicle and launching such vehicle, comprising the steps of:
   determining if a manual clutch pedal is fully depressed,
   determining if such motor vehicle is stationary,
   determining if a throttle pedal is depressed beyond a first predetermined threshold,
   braking two non-driving wheels of such motor vehicle,
   determining if such manual clutch pedal has been released beyond a second predetermined threshold, and
   releasing said braking of such two non-driving wheels to allow launch of such motor vehicle.

9. The method of eliminating pre-launch movement of a motor vehicle of claim 8 further including the step of providing an operator selectable switch for selecting between normal vehicle operation or operation of said pre-launch movement eliminating method.

10. The method of eliminating pre-launch movement of a motor vehicle of claim 8 further including the step of selecting between normal vehicle operation or operation of said pre-launch movement eliminating method.

11. The method of eliminating pre-launch movement of a motor vehicle of claim 8 further including the step of repeating said method steps at a predetermined interval if it is determined that such manual clutch pedal is not fully depressed, if it is determined that such motor is not stationary or if it is determined that such throttle pedal is not depressed beyond a predetermined threshold.

12. The method of eliminating pre-launch movement of a motor vehicle of claim 8 wherein said step of braking two non-driving wheels of such motor vehicle is undertaken through an anti-lock braking system of such motor vehicle.

13. The method of eliminating pre-launch movement of a motor vehicle of claim 8 wherein said second predetermined threshold of such manual clutch pedal substantially coincides with incipient clutch engagement.

* * * * *